United States Patent
Merola et al.

(10) Patent No.: US 11,767,888 B2
(45) Date of Patent: Sep. 26, 2023

(54) HYBRID MODULE

(71) Applicant: Schaeffler Technologies AG & Co. KG, Herzogenaurach (DE)

(72) Inventors: Massimo Merola, Karlsruhe (DE); Stefan Mackowiak, Malsch (DE); Robert Maier, Gernsbach (DE)

(*) Notice: Subject to any disclaimer, the term of this patent is extended or adjusted under 35 U.S.C. 154(b) by 37 days.

(21) Appl. No.: 17/607,496

(22) PCT Filed: Jan. 27, 2020

(86) PCT No.: PCT/DE2020/100050
§ 371 (c)(1),
(2) Date: Oct. 29, 2021

(87) PCT Pub. No.: WO2020/221384
PCT Pub. Date: Nov. 5, 2020

(65) Prior Publication Data
US 2022/0221008 A1 Jul. 14, 2022

(30) Foreign Application Priority Data
Apr. 30, 2019 (DE) .................... 10 2019 111 171.4

(51) Int. Cl.
| | |
|---|---|
| *F16D 13/74* | (2006.01) |
| *F16D 13/52* | (2006.01) |
| *F16D 21/00* | (2006.01) |
| *F16D 23/12* | (2006.01) |
| *F16D 28/00* | (2006.01) |

(52) U.S. Cl.
CPC ............. *F16D 13/74* (2013.01); *F16D 13/52* (2013.01); *F16D 21/00* (2013.01); *F16D 23/12* (2013.01); *F16D 28/00* (2013.01); *F16D 2300/22* (2013.01)

(58) Field of Classification Search
CPC .......... F16D 13/74; F16D 13/52; F16D 21/00; F16D 2300/26; F16D 25/123; B60K 6/20; B60K 6/22
See application file for complete search history.

(56) References Cited

U.S. PATENT DOCUMENTS

| | | | |
|---|---|---|---|
| 11,331,996 B2* | 5/2022 | Bayer | B60K 6/365 |
| 2009/0283344 A1* | 11/2009 | Arnold | F16D 25/123 180/65.22 |

(Continued)

FOREIGN PATENT DOCUMENTS

| | | |
|---|---|---|
| CN | 102205789 A | 10/2011 |
| CN | 103987555 A | 8/2014 |

(Continued)

*Primary Examiner* — Stacey A Fluhart

(57) ABSTRACT

A hybrid module includes a housing with a multiple clutch accommodated therein having a first, a second and a third clutch device and a support in an axial end position, and an electric machine which is arranged in an axially parallel manner on the housing and is coupled to the multiple clutch via a gear connection which transmits a torque. The housing is closed axially either by a housing cover portion axially and radially adjoining the support or by a transmission wall, axially adjoining the support, of a transmission connected downstream. A lubricant to be delivered to the multiple clutch can be delivered to the support either radially via at least one feed conduit or axially via at least one feed conduit.

7 Claims, 5 Drawing Sheets

(56) References Cited

U.S. PATENT DOCUMENTS

| | | | | |
|---|---|---|---|---|
| 2011/0240384 A1* | 10/2011 | Roske | ................... | B60K 6/40 903/902 |
| 2013/0145879 A1* | 6/2013 | Nakamura | ............ | F16H 57/043 74/467 |
| 2021/0277960 A1* | 9/2021 | Ortmann | ................ | B60K 6/387 |

FOREIGN PATENT DOCUMENTS

| | | | |
|---|---|---|---|
| CN | 107856526 A | | 3/2018 |
| CN | 207333660 U | * | 5/2018 |
| DE | 102013006429 A1 | | 10/2014 |
| DE | 102017100928 A1 | | 7/2018 |
| DE | 102017121636 A1 | | 11/2018 |
| DE | 102019104073 A1 | | 8/2020 |
| DE | 102019104075 A1 | | 8/2020 |
| DE | 102020117459 A1 | * | 1/2022 |
| EP | 1541401 A1 | | 6/2005 |
| WO | 2019024956 A1 | | 2/2019 |

* cited by examiner

HYBRID MODULE

CROSS-REFERENCE TO RELATED APPLICATIONS

This application is the U.S. National Phase of PCT Appln. No. PCT/DE2020/100050 filed Jan. 27, 2020, which claims priority to DE 102019111171.4 filed Apr. 30, 2019, the entire disclosures of which are incorporated by reference herein.

TECHNICAL FIELD

The disclosure relates to a hybrid module comprising a housing with a multiple clutch accommodated therein having a first, a second and a third clutch device and support in an axial end position, and an electric machine.

BACKGROUND

In modern motor vehicles, hybrid modules are increasingly being used, which offer the possibility of being able to operate the vehicle either by means of an internal combustion engine or by means of an electric machine. The multiple clutch, comprising three separate clutch devices, usually referred to as K0, K1 and K2, enables a corresponding coupling operation to the downstream transmission. The K0 clutch enables the internal combustion engine to be coupled and uncoupled from the drive train. This means that the transfer of torque can be controlled either from the internal combustion engine to the transmission or from the electric machine to the transmission. The basic structure of such a hybrid module is known.

There is always the requirement to design such a hybrid module as compactly as possible in order to make the best possible use of the often small space available or to be able to integrate the hybrid module, wherein the operation of the hybrid module and in particular the lubricant supply must of course be ensured at the same time.

SUMMARY

The disclosure is therefore based on the problem of specifying a hybrid module that is improved in comparison.

To solve this problem, a hybrid module is provided according to the disclosure, comprising a housing with a multiple clutch accommodated therein having a first, a second and a third clutch device and a support in an axial end position, and an electric machine which is arranged in an axially parallel manner on the hybrid motor housing and is coupled to the multiple clutch via a gear connection which transmits a torque, wherein the housing is closed axially either by means of a housing cover portion axially and radially adjoining the support or by means of a transmission wall, axially adjoining the support, of a transmission connected downstream, wherein a lubricant to be delivered to the multiple clutch can be delivered to the support either radially via at least one feed conduit or axially via at least one feed conduit.

On the one hand, the hybrid module according to the disclosure is extremely compact, so that, due to its compactness, it can be integrated even with little installation space. At the same time, however, it also offers the possibility of being able to transmit the required torque, as well as ensuring a corresponding supply of lubricant for the multiple clutch. The electric machine is arranged axially parallel and offset radially outward with respect to the clutch-side output shaft on the housing, i.e., is fastened directly to it. In order to be able to transmit the torque from the electric machine to the output shaft, a gear connection is provided via which the electric machine is coupled to the multiple clutch. This gear connection comprises a first gearwheel which is driven via the electric machine and which meshes with a second gearwheel provided on the clutch side. This means that there are two specific interfaces between the housing and the axially parallel electric machine, namely, on the one hand, the gear connection via which the required torque can be transmitted, and, on the other hand, the housing-side connection of the electric machine directly to the hybrid module housing, where it is screwed on accordingly.

Another interface is provided within the hybrid module housing, namely in relation to the axial termination of the housing, which can be designed differently. According to a first variant, the housing can be closed axially via a housing cover portion of the hybrid module housing itself, for which purpose this housing cover portion is axially and radially connected to a support of the multiple clutch, which is arranged coaxially to the output shaft axis. The housing cover portion is firmly screwed to the support via a series of connecting screws. This forms a closed, compact system, resulting from the axial and radial nesting of the support and the housing cover portion and their direct connection. In this case, the lubricant is supplied radially to the support of the multiple clutch, usually a steel support, after the transmission is flanged on and coupled to the clutch output shaft when viewed axially.

Alternatively to this, the housing closure of the hybrid module housing can also take place through a transmission wall of the downstream transmission itself, i.e., the transmission wall is virtually integrated on the hybrid module side. This transmission wall is axially directly downstream of the support or steel support, so that the transmission wall can be screwed directly to the support and an internal screw connection between the housing and the steel support is not required. This configuration is particularly expedient with regard to shortening the axial installation space, since ultimately the wall thickness of the housing cover portion can be dispensed with, as this is not required for the housing closure. However, this also means that the housing of the hybrid module can be designed in a significantly reduced and simpler manner, also in terms of weight. The supply of lubricant in this case can either take place radially to the support, as already described in the first variant, but it can also, preferably in this case, take place axially, namely via the transmission wall itself, which will be discussed below.

Overall, the hybrid module according to the disclosure is characterized by a high degree of compactness, although all functions are ensured and a corresponding lubricant supply is also provided.

Starting from the first variant of the disclosure with the housing cover portion axially closing the housing, a radial bore forming the feed conduit can be provided in a further development of the disclosure on the housing cover portion axially closing the housing and opening into a radial bore provided on the support. In this case, the lubricant supply to the support is ensured via a radial bore, from where the lubricant is further distributed in order to be supplied to the three individual clutch devices. The radial bore opens on the outside of the housing cover portion, so that a corresponding lubricant feed conduit can be connected to it.

A radial supply of lubricant is also conceivable within the scope of the second variant of the disclosure with the housing closure via the transmission wall. In this case, a corresponding housing wall portion of the housing, which is positioned axially adjacent to the transmission wall, would be provided with a corresponding radial bore through which the lubricant can flow.

Alternatively to the formation of the lubricant supply line via a radial bore formed on the housing cover portion, it is also conceivable to provide a supply pipe which forms the supply line and opens into a radial bore provided on the support. This embodiment is expedient if the housing wall portion is designed to be as reduced as possible, in particular to save weight, and it is possible to supply the lubricant via such a feed pipe, which is significantly lighter than a corresponding housing section. This feed pipe opens into a corresponding radial bore on the support side, i.e., again directly on the support itself.

It is conceivable that a radial portion of the support engages in a recess of the housing cover portion delimited radially outward via a cover edge portion, wherein the feed pipe extends through the recess and passes through a bore in the cover edge portion. The cover is therefore correspondingly reduced, in particular to save weight, and is provided with a recess through which the feed pipe extends. With one end it opens into the corresponding radial bore of the support, and with the other end it passes through a bore in a cover edge portion, which closes the recess radially on the outside, wherein the connection of the supply pipe to a corresponding supply line also takes place in this area.

If a transmission wall is provided, via which the axial housing closure takes place, then there is preferably an axial supply of lubricant to the support, to which the transmission wall is screwed accordingly. For this purpose, the transmission wall is provided with a suitable axial bore which opens into an axial bore provided on the support, wherein the axial bore on the support side can also merge into a radial bore opening into an output shaft of the multiple clutch, depending on how specifically the lubricant supply or the downstream lubricant path is designed. In this case, an axial lubricant supply takes place directly out of the transmission, which is particularly simple since the support and the transmission wall are in any case axially flat against one another, so that the lubricant supply from the transmission can be ensured by means of two simple, mutually merging axial bores.

Furthermore, a damping device can be provided in the housing itself, which is used to dampen corresponding torque fluctuations, wherein such a damping device can operate either dry or wet. It is also possible to integrate a centrifugal pendulum in the housing.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
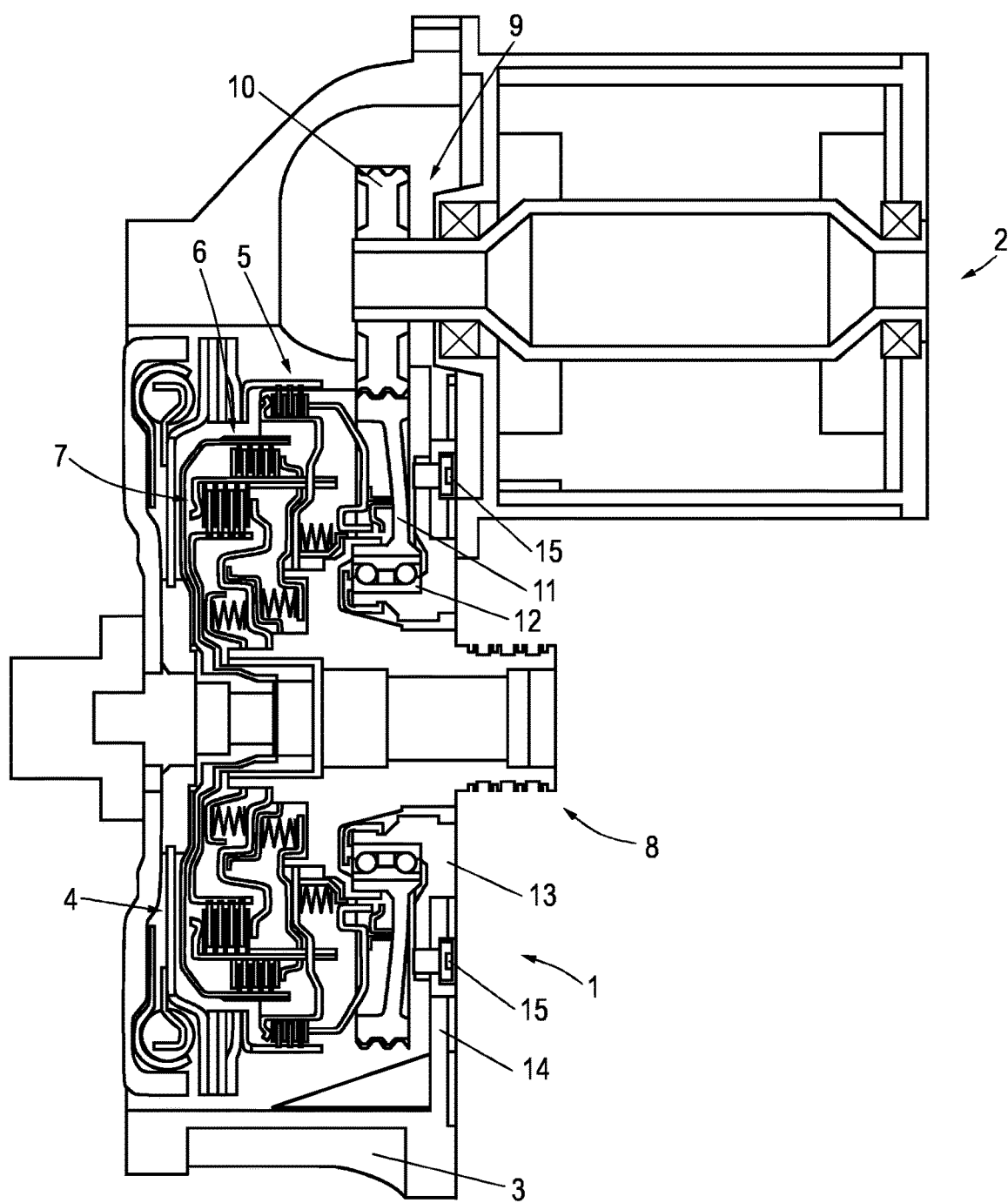
FIG. 1 shows a schematic diagram of a first variant of a hybrid module according to the disclosure.

FIG. 1 shows a hybrid module 1 according to the disclosure with an electric machine 2. The hybrid module 1 comprises a housing 3 in which a multiple clutch 4 comprising a first clutch device 5, usually also referred to as K0 clutch, a second clutch device 6, usually referred to as K1 clutch, and a third clutch device 7, usually referred to as K2 clutch, is provided. The basic structure of such a multiple clutch and its function is well known. The K0 clutch is used to couple and uncouple the internal combustion engine, which is connected to the left side of the hybrid module 1, and to connect the electric machine 2. The respective torque can be provided via the multiple clutch 4 to an output shaft arrangement 8, only partially shown here, from where the torque is delivered to the transmission on the right.

As FIG. 1 shows, the electric machine 2 is arranged offset radially outward, but is screwed directly onto the housing 3 of the hybrid module 1. In order to be able to transmit the torque, a gear connection 9 is provided, comprising a gearwheel 10 connected directly to the output of the electric machine 2, which meshes with a hybrid module-side gearwheel 11 rotatably mounted by means of a corresponding rolling bearing 12 on a support 13, usually a steel support.

Figure 3:
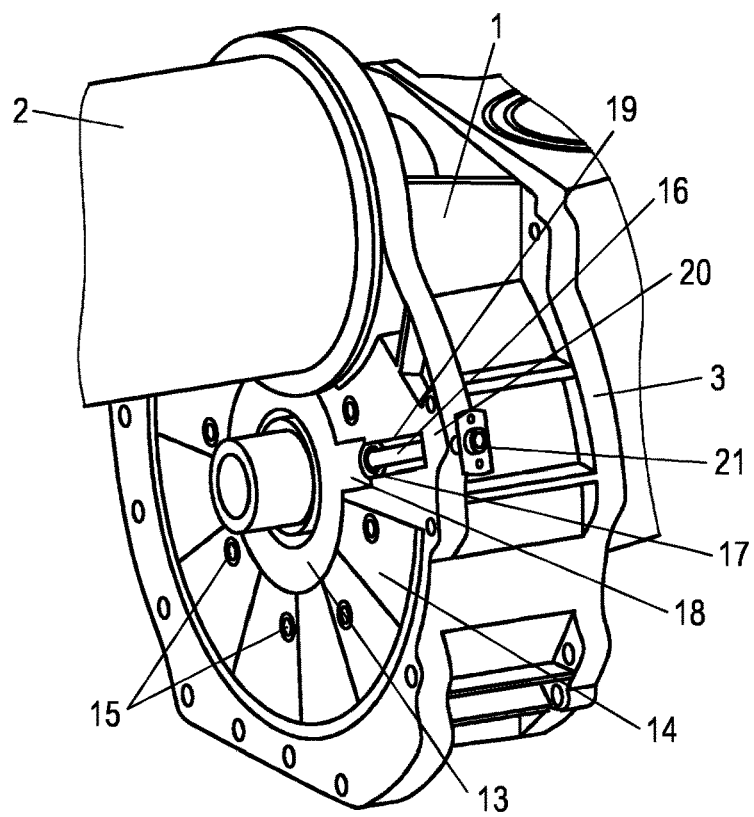
FIG. 3 shows a perspective view of the hybrid module from FIG. 1 showing the lubricant supply.

The housing 3 has, see in particular also FIG. 3, a housing cover portion 14 which, see the sectional view according to FIG. 1, adjoins the support 13 both radially and axially, i.e., both are nested axially and radially. The housing cover portion 14 is firmly connected to the support 13 via various connecting screws 15, wherein, see FIG. 3, the axial closure of the housing 3 is provided both by the internal support 13 and by the housing cover portion 14 that encompasses it radially.

In this embodiment, the lubricant, which is used to supply the clutch devices 5, 6, 7, is supplied from radially outside the housing 3. In the example shown, see FIG. 3, a feed pipe 16 is provided which opens into a radial bore 17 of a radial portion 18 of the support 13. The radial portion 18 engages to some extent in a recess 19 in the housing cover portion 14, which recess 19 is closed radially outward via a cover edge portion 20. The feed pipe 16 extends through this cover edge portion 20, so that a feed conduit can be connected to a radially outer connection 21.

By means of the radial bore in the radial portion 18 of the support 13, the lubricant gets into the interior of the housing and thus into the area of the multiple clutch 4, where it can be guided directly into the required coupling areas via suitable channel portions.

Instead of the design shown in FIG. 3 with the feed tube 16, however, it is also conceivable, in the case of a closed housing cover portion 14, to implement the feed line via a radial bore which opens radially on the outside of the housing cover portion 14 and communicates radially on the inside with a corresponding radial bore 17 of the support 13.

Figure 4:
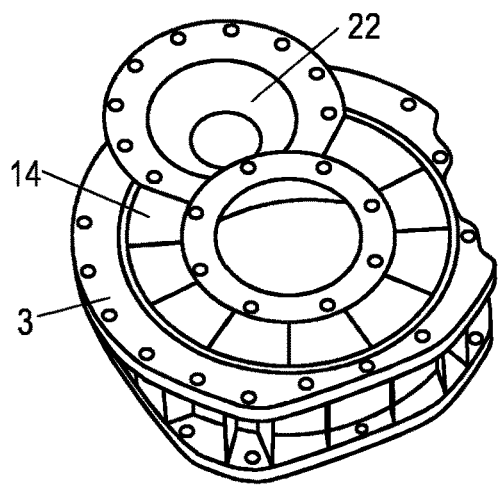
FIG. 4 shows a perspective view of the hybrid module housing.

Finally, FIG. 4 shows a perspective view of the housing 3, with the housing cover portion 14 and a dome-like receiving space 22 formed thereon (see also FIG. 1), in which the gear connection or the gearwheel 10 is received, from where the torque is transmitted.

The first embodiment variant of the hybrid module according to the disclosure shown in FIGS. 1 to 4 is characterized by a high degree of compactness, although the required torque can be transferred, as well as a lubricant supply is ensured. It is particularly distinguished by two interfaces between the electric machine 2 and the housing 3 of the hybrid module 1, wherein one interface is implemented via the gear connection 9, by means of which the required torque can be transferred. The second interface is necessary for the connection of the electric machine 2 to the hybrid module housing 3, wherein the electric machine 2 is screwed directly to the housing 3. Seen locally, the electric machine 2 is located above the multiple clutch 4, i.e., here the triple clutch Another interface is located within the hybrid module housing, namely the interface of the screw connection of the housing 3 or the housing cover portion 14 via the screws 15 to the support 13 of the multiple clutch 4. This interface enables the construction of a self-contained, compact system. In the exemplary embodiment shown, the necessary lubricant supply takes place via the supply pipe 16, but can alternatively also be implemented via a direct radial bore in the housing cover portion 14. Finally, the integration of a damper operating dry or wet is possible, as well as the integration of a centrifugal pendulum.

Figure 5:
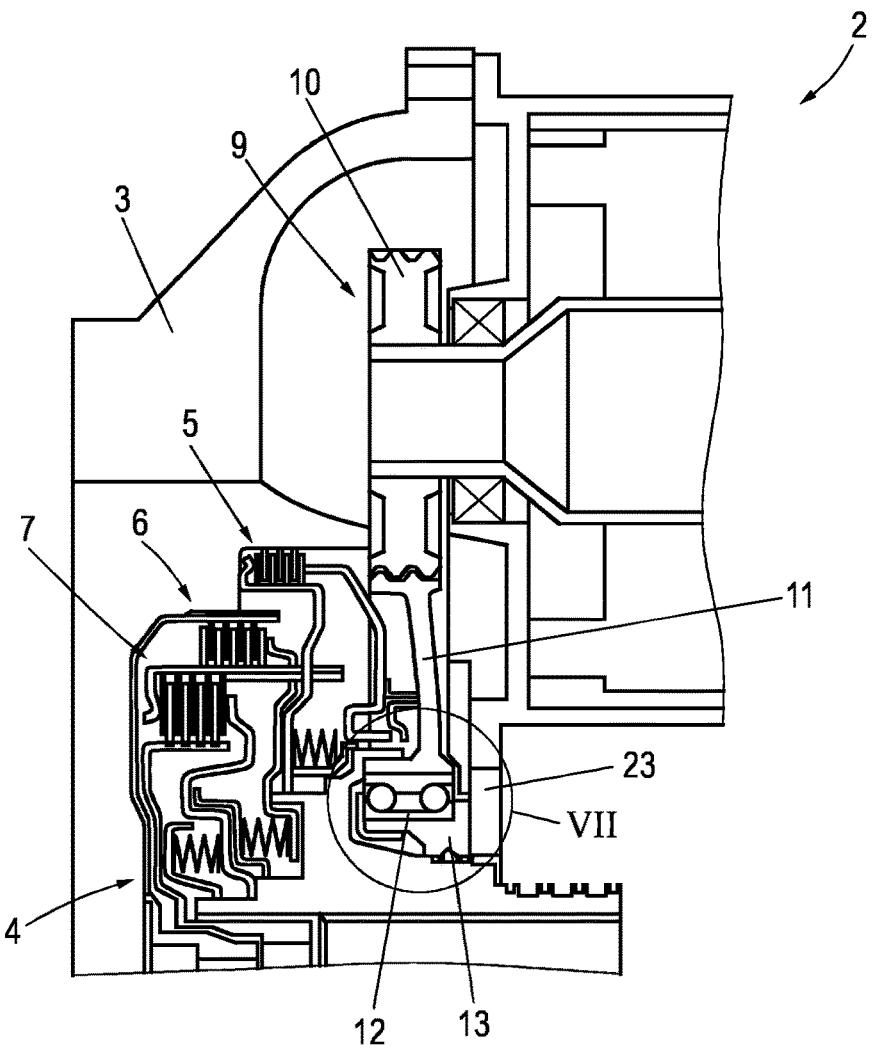
FIG. 5 shows a partial view of a second embodiment of a hybrid module according to the disclosure.
Figure 6:
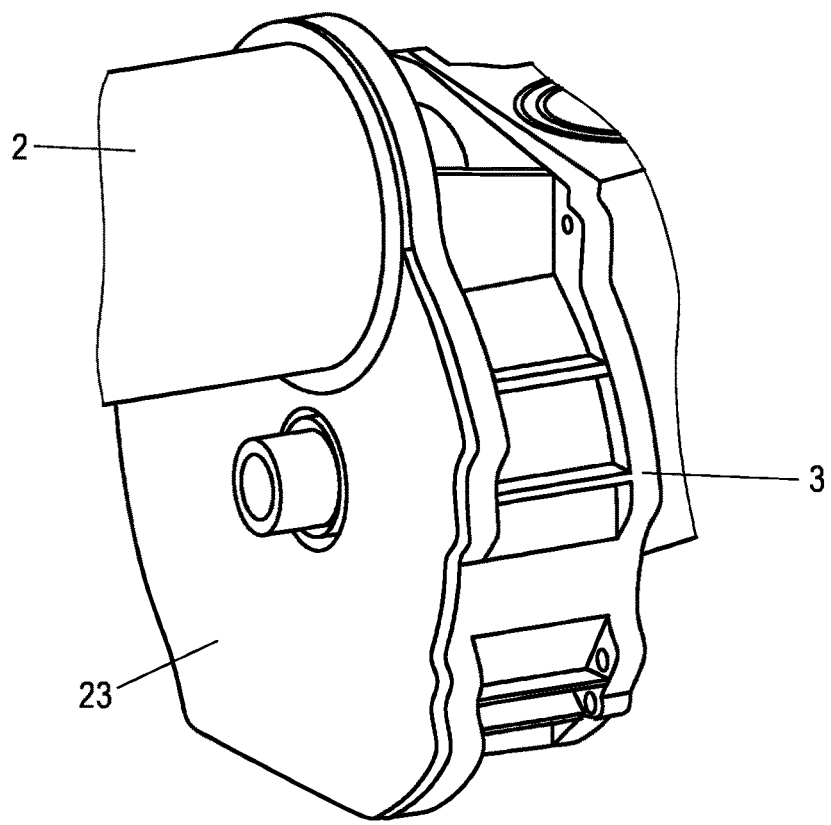
FIG. 6 shows a perspective view of the hybrid module according to FIG. 5.
Figure 7:
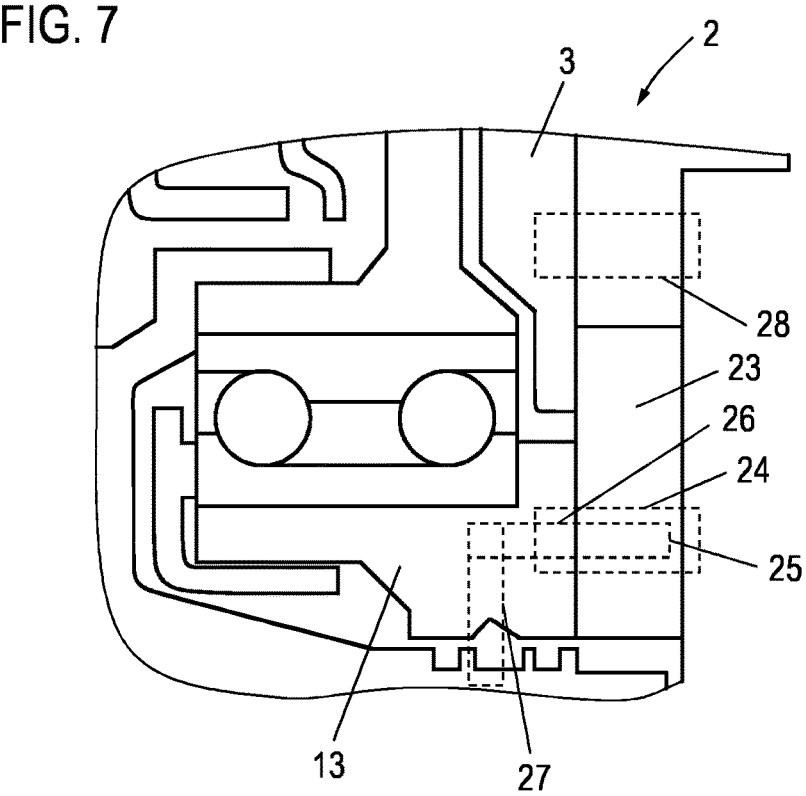
FIG. 7 shows an enlarged detail view of the area VII from FIG. 5.

A second variant of the disclosure is shown in FIGS. 5-8. In this embodiment of the disclosure, which enables the installation space to be shortened in the axial direction, the housing 3 is axially closed by means of a transmission wall 23, which, see the schematic diagram according to FIG. 4 is screwed directly to the support 13 by means of various screw connections 24, which are only indicated in principle in FIG. 7. The basic structure of the hybrid module 1 according to FIGS. 5-7 is comparable to that of FIG. 1, i.e., an electric machine 2 is also directly attached to the housing 3, wherein a multiple clutch 4 with the three individual clutch devices 5, 6, 7 is again provided in the housing 3. The transfer of torque from the electric machine 2 to the multiple clutch 4 takes place here again via a gear connection 9 with the gearwheels 10, 11, wherein the gearwheel 11 in turn is mounted on the support 13 via a rolling bearing 12.

Figure 2:
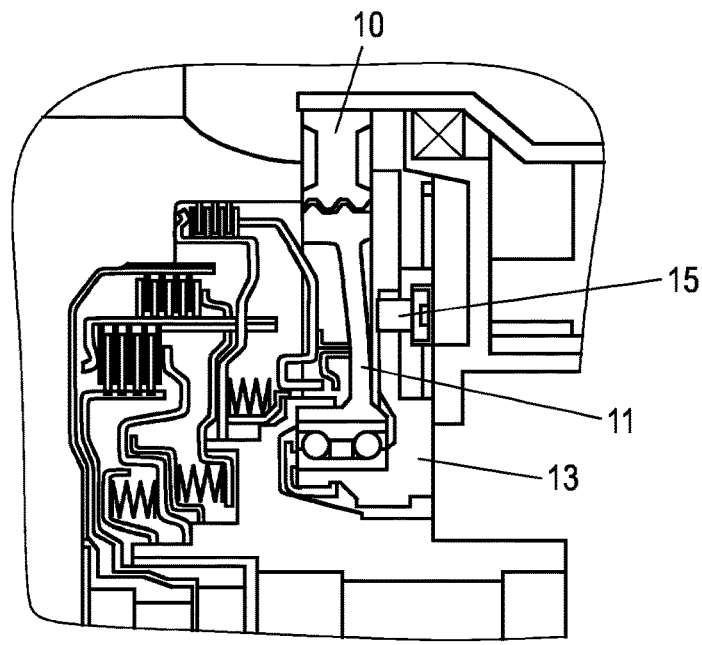
FIG. 2 shows an enlarged partial view of the hybrid module from FIG. 1 in the region of the multiple clutch.

However, compared to the design according to FIG. 2 in the first variant, the support 13 is axially shorter, since in this variant the housing is closed via the transmission wall 23.

The lubricant is supplied axially here, for which purpose, see FIG. 7, an axial bore 25 provided in the transmission wall 23, indicated in FIG. 7, merges into an axial bore 26 in the support 13, wherein the axial bore 26 optionally merges into a radial bore 27 in the example shown. This means that the lubricant is supplied here directly from the transmission and not, as in variant 1, radially from the outside, although this would in principle also be possible in this variant according to FIGS. 5-8.

Here, the electric machine 2 is fastened directly to the housing 3, as indicated in FIG. 7 by means of the screw connections 28. In this embodiment, the housing 3 itself is not screwed to the support 13; rather, it is screwed to the transmission wall 23 by means of the screw connection 25 alone.

Figure 8:
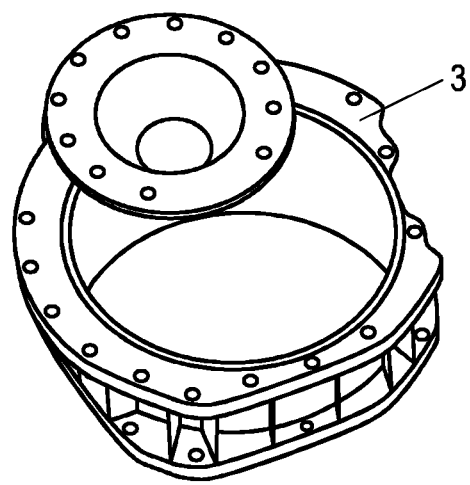
FIG. 8 shows a perspective view of the second variant of the hybrid module housing.

Since the housing 3 according to this second variant does not have a housing cover portion, the housing 3 can, see FIG. 8, be of a much simpler and reduced design. As can be seen, the housing 3 according to FIG. 8 does not have a cover portion that is drawn radially inward, like the housing 3 of the first variant, see FIG. 4 in this regard.

In the embodiment according to FIGS. 5-8, a direct connection or integration of the transmission wall 23 to the support 13 takes place. As a result of this direct connection, there is no need to screw the housing 3 to the support 13 internally in the hybrid module 1, which offers potential savings in terms of the axial installation space. By using the transmission wall 23 of the downstream transmission, it is also possible to optimize the housing 3 itself as well as the support 13 in terms of weight and dimensioning and thus ultimately also the costs, since there is no corresponding cover portion to be provided on the housing side, as the support 13 can also be made shorter. The lubricant is preferably supplied directly axially from the transmission wall, but could also be done radially if necessary.

Here, too, it is conceivable to integrate a dry or wet damping device or a centrifugal pendulum.

LIST OF REFERENCE NUMBERS

Hybrid module
Electric machine
Housing
Multiple clutch
Clutch device
Clutch device
Clutch device
Output shaft assembly
Gear connection
Gearwheel
Gearwheel
Rolling bearing
Support
Housing cover portion
Connecting screw
Feed pipe
Radial bore
Radial portion
Recess
Cover edge portion
Connection
Mounting space
Transmission wall
Screw connection
Screw connection
Axial bore
Radial bore
Screw connection

The invention claimed is:

1. A hybrid module comprising a housing having a multiple clutch accommodated therein having a first, a second and a third clutch device and a support in an axial end position, and an electric machine which is arranged in an axially parallel manner on the housing and is coupled to the multiple clutch via a gear connection which transmits a torque, wherein the housing is closed axially by a housing cover portion axially and radially adjoining the support, wherein a lubricant to be delivered to the multiple clutch can be delivered to the support via a first radial bore provided on the housing cover portion axially closing the housing, wherein the first radial bore opens into a second radial bore provided on the support.

2. The hybrid module according to claim 1, wherein a damping device operating dry or wet is provided in the housing.

3. The hybrid module according to claim 1, wherein a centrifugal pendulum is provided in the housing.

4. A hybrid module, comprising: a housing having a multiple clutch accommodated therein having a first, a second and a third clutch device and a support in an axial end position, and an electric machine arranged in an axially parallel manner on the housing and coupled to the multiple clutch via a gear connection which transmits a torque, wherein the housing is closed axially by a housing cover portion axially and radially adjoining the support, wherein a lubricant to be delivered to the multiple clutch can be delivered to the support via a feed pipe provided on the housing cover portion that opens into a radial bore provided on the support.

5. The hybrid module according to claim 4, wherein a radial portion of the support engages in a recess of the housing cover portion delimited radially outward via a cover edge portion, wherein the feed pipe extends through the recess and passes through a bore in the cover edge portion.

6. A hybrid module, comprising: a housing having a multiple clutch including a first, a second and a third clutch device and a support in an axial end position, and an electric machine arranged in an axially parallel manner on the housing and is coupled to the multiple clutch via a gear connection which transmits a torque, wherein the housing is closed axially by a transmission wall, axially adjoining the support, of a transmission connected downstream, wherein a lubricant to be delivered to the multiple clutch can be delivered to the support via a first axial bore provided on the transmission wall, which first axial bore opens into a second axial bore provided on the support.

7. The hybrid module according to claim 6, wherein the second axial bore merges into a radial bore opening into an output shaft of the multiple clutch.

* * * * *